(12) United States Patent
Perryman, Jr.

(10) Patent No.: US 8,343,345 B1
(45) Date of Patent: Jan. 1, 2013

(54) TEMPORARY CLOSURE FOR DISPOSABLE FLUID FILTERS

(76) Inventor: James A. Perryman, Jr., Mooresville, NC (US)

( * ) Notice: Subject to any disclaimer, the term of this patent is extended or adjusted under 35 U.S.C. 154(b) by 289 days.

(21) Appl. No.: 12/661,738

(22) Filed: Mar. 23, 2010

(51) Int. Cl.
*B01D 35/00* (2006.01)

(52) U.S. Cl. .. 210/248; 210/251; 210/443; 210/DIG. 17

(58) Field of Classification Search ................. 210/248, 210/251, 440, 443, DIG. 17; 220/212.5, 220/288, 254.8
See application file for complete search history.

(56) References Cited

U.S. PATENT DOCUMENTS

| | | | |
|---|---|---|---|
| 3,042,215 A | 7/1962 | Gruner | |
| 4,416,776 A | 11/1983 | Brundidge | |
| 4,507,199 A * | 3/1985 | Carlisle | 210/238 |
| 5,702,599 A * | 12/1997 | Brown et al. | 210/248 |
| 6,585,887 B2 | 7/2003 | Michels et al. | |
| 2003/0062221 A1 | 4/2003 | Burrow et al. | |
| 2007/0144958 A1 | 6/2007 | Gilles et al. | |
| 2008/0060993 A1 | 3/2008 | Yano | |
| 2008/0060994 A1 | 3/2008 | Yano | |
| 2008/0110811 A1 | 5/2008 | Brown et al. | |

\* cited by examiner

*Primary Examiner* — Matthew Savage
(74) *Attorney, Agent, or Firm* — Schwartz Law Firm, P.C.

(57) ABSTRACT

A fluid filter is adapted for operatively mounting within a circuit of moving fluid in a machine. The fluid filter comprises a filter housing, and defines a fluid inlet, a fluid outlet, and a filtration medium disposed within the filter housing between the fluid inlet and the fluid outlet. A temporary closure is designed for attachment at the fluid outlet of the fluid filter after the fluid filter is used and removed from the machine. The temporary closure functions to substantially contain residual fluid within the filter housing prior to subsequent processing of the used fluid filter.

9 Claims, 4 Drawing Sheets

TEMPORARY CLOSURE FOR DISPOSABLE FLUID FILTERS

TECHNICAL FIELD AND BACKGROUND

The present disclosure relates broadly to fluid filters, such as disposable spin-on oil filters for automobiles, and more particularly, to a temporary closure designed for substantially containing residual fluid within a used fluid filter prior to draining for disposal or reuse.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a fluid filter adapted for operatively mounting within a circuit of moving fluid in a machine. The fluid filter includes a filter housing defining a fluid inlet, a fluid outlet, and a filtration medium disposed within the filter housing between the fluid inlet and the fluid outlet. A temporary closure is designed for attachment at the fluid outlet of the fluid filter after the fluid filter is used and removed from the machine. The temporary closure comprises a cylindrical threaded base, an enlarged-diameter solid wall top, and a low-profile handle. The threaded base is adapted for mating with a complementary threaded opening at the fluid outlet of the fluid filter. The enlarged-diameter solid wall top is formed with the base, and is adapted for covering both of the fluid inlet and the fluid outlet of the fluid filter. The low-profile handle is formed with the top of the closure and comprises at least one radial extension. A filter baseplate is located at an open end of the filter housing and defines a circular recess receiving a sealing gasket. The sealing gasket defines a recessed circular area with the baseplate. The top of the closure is adapted to reside entirely down inside the circular area defined by the sealing gasket, such that when the temporary closure is attached to the fluid filter the radial extension of the low-profile handle extends outwardly from the top to a point not beyond the recessed circular area defined by the sealing gasket. The temporary closure thereby functions to substantially contain residual fluid within the filter housing prior to subsequent processing of the used fluid filter (e.g., for disposal or reuse).

According to another exemplary embodiment, the closure comprises a cylindrical threaded base adapted for mating with a complementary threaded opening at the fluid outlet of the fluid filter.

According to another exemplary embodiment, the closure further comprises an enlarged-diameter solid wall top formed with the base and adapted for covering both of the fluid inlet and the fluid outlet of the fluid filter.

According to another exemplary embodiment, a low-profile handle is formed with the top of the closure. The handle may define a longitudinal cross-section which tapers in elevation from a center point of the top towards an outside edge of the top.

According to another exemplary embodiment, the combined height of the top and the handle is less than 1.0 cm.

According to another exemplary embodiment, the diameter of the top is greater than 5.0 cm.

According to another exemplary embodiment, the diameter of the base is less than 2.0 cm.

According to another exemplary embodiment, a filter baseplate is located at an open end of the filter housing, and defines a circular recess receiving a sealing gasket. The top of the closure resides inside a circular area defined by the sealing gasket.

According to another exemplary embodiment, the top of the closure occupies substantially the entire circular area defined by the sealing gasket.

According to another exemplary embodiment, the top and the base of the closure are integrally formed together (e.g., by molding) as a single homogenous unit.

In another exemplary embodiment, the present disclosure comprises a disposable spin-on oil filter in combination with a temporary closure. The oil filter is adapted for operatively mounting within a circuit of moving fluid in an automobile. The exemplary oil filter comprises a filter housing, and defines a fluid inlet, a fluid outlet, and a filtration medium disposed within the filter housing between the fluid inlet and the fluid outlet. The temporary closure is designed for attachment at the fluid outlet of the oil filter after the oil filter is used and removed from the machine. The temporary closure functions to substantially contain residual fluid within the filter housing prior to disposal of the used oil filter.

In yet another exemplary embodiment, the present disclosure comprises a method for disposing of a fluid filter. The fluid filter is adapted for operatively mounting within a circuit of moving fluid in a machine. The fluid filter comprises a filter housing, and defines a fluid inlet, a fluid outlet, and a filtration medium disposed within the filter housing between the fluid inlet and the fluid outlet. The method includes removing the used fluid filter from the machine. Once removed, a temporary closure is attached at the fluid outlet of the used fluid filter. The temporary closure functions to substantially contain residual fluid within the filter housing prior to disposal of the used fluid filter. The temporary closure is later removed from the used fluid filter to drain the residual fluid contained in the filter housing. After the filter housing is substantially drained, the emptied fluid filter is disposed of.

Alternatively, the exemplary method may comprise a process for cleaning (or draining) a used fluid filter for subsequent reuse.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
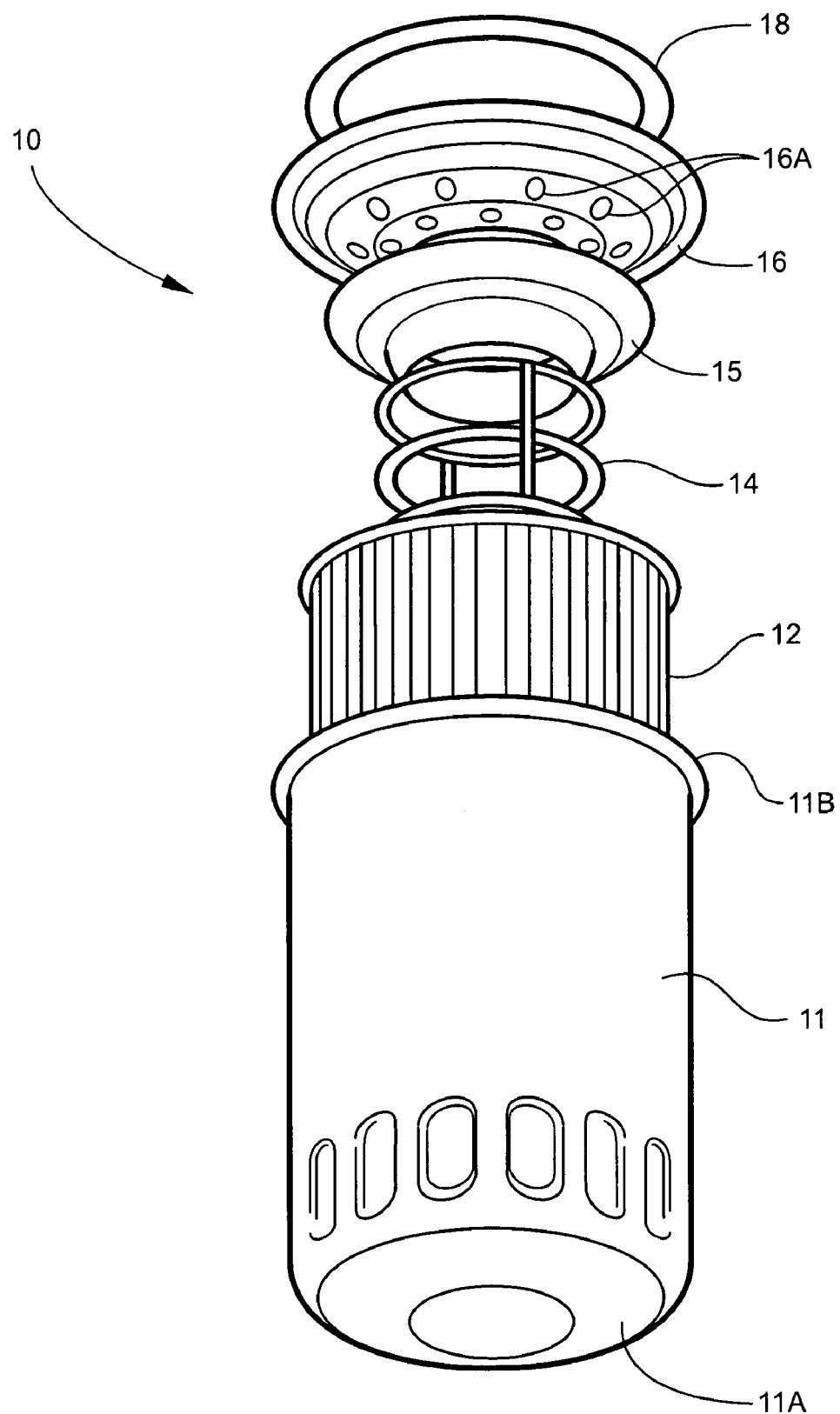
FIG. 1 is a view of a conventional spin-on oil filter showing various components of the oil filter exploded away.

Referring now specifically to the drawings, a standard disposable spin-on oil filter for automobiles is illustrated in FIG. 1, and shown generally at reference numeral 10. Such filters are commonly known and used in the automotive industry. The exemplary oil filter 10 includes a self-contained filter housing 11 having a closed end 11A and an open end 11B, a tubular filter pack 12 residing within the filter housing 11, a rigid wire core 14, an anti-drain back valve 15, a perforated baseplate 16, and a sealing gasket 18. The sealing gasket 18 is arranged within a circular recess 19 (See FIGS. 3 and 4) defined by the baseplate 16. The baseplate 16 is located at the open end 11B of the filter housing 11, and cooperates with the anti-drain back valve 15 to form a generally one-way fluid inlet through spaced-apart perforations 16A. A threaded center opening 16B of the baseplate 16, shown in FIG. 2A, defines a fluid outlet of the oil filter 10. Other exemplary components may be described and shown in prior U.S. Pat. No. 6,585,887 issued to Champion Laboratories, Inc. The complete disclosure of this prior patent is incorporated by reference herein. While exemplary embodiments of the present disclosure include and incorporate a spin-on oil filter, it is to be understood that the broad concept of the disclosure has application to a variety of other fluid filters and filtering devices.

The oil filter 10 attaches to the automobile in a conventional manner by mating complementary threads at the center opening 16B of the perforated baseplate 16 and the engine mounting post (not shown). When the engine is operating, flowing (or pressurized) oil moves in a circuit entering the housing 11 of the oil filter 10 through perforations 16A in the baseplate 16 and passing through pleated filtration media of the filter pack 12 for cleaning. The filtered oil is then returned to the engine for reuse through the center opening 16B (or fluid outlet) of the oil filter 10. Once the used oil filter 10 is spent, it is unscrewed from the threaded mounting post of the automobile and replaced with a new filter. A temporary closure 20, shown in FIGS. 2A and 2B, is attached to the used oil filter 10 at its fluid outlet 16B to prevent leakage of residual oil from the filter housing 11 prior to proper disposal.

Figure 3:
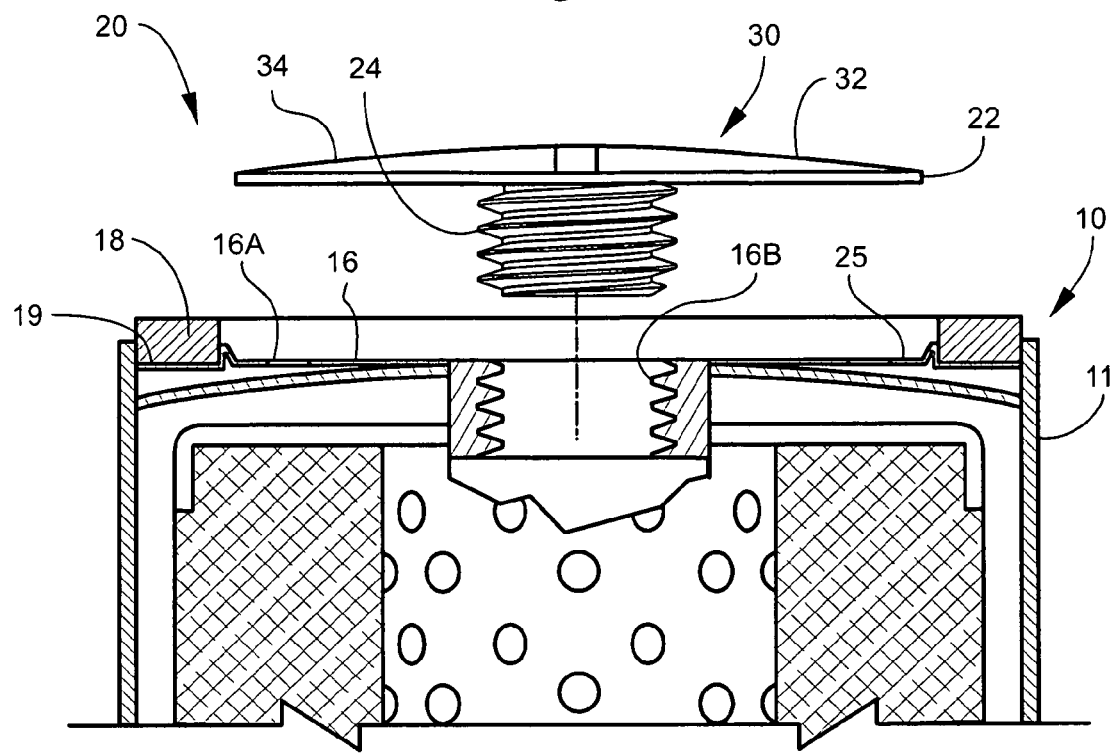
FIG. 3 is a fragmentary cross-sectional view of the oil filter with the temporary closure removed.
Figure 4:
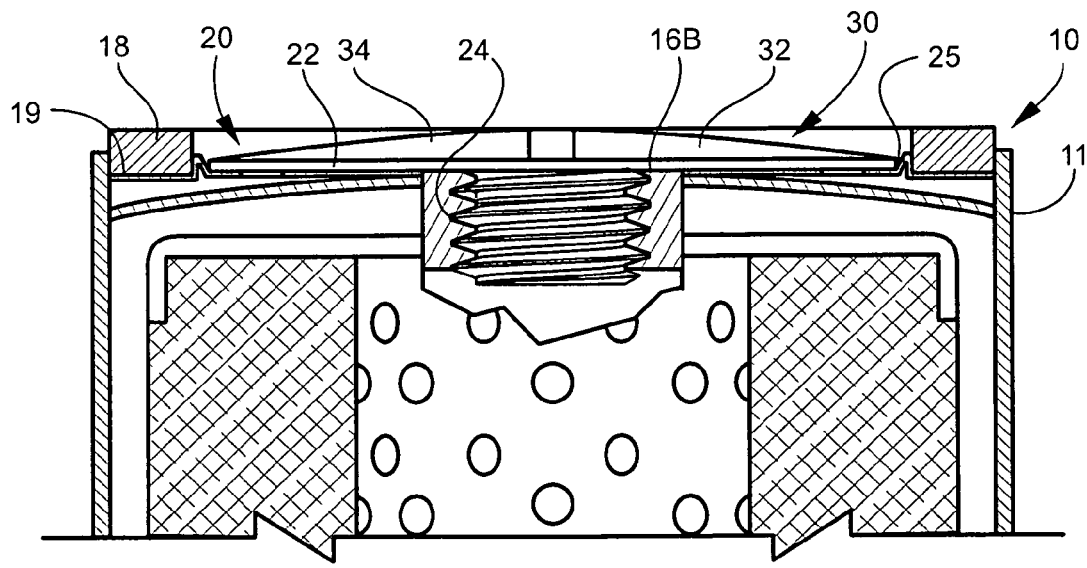
FIG. 4 is a fragmentary cross-sectional view of the oil filter taken substantially along line 4-4 of FIG. 5, and showing the temporary closure attached.

Referring to FIGS. 3 and 4, the exemplary closure 20 comprises a circular solid-wall top 22 and a cylindrical solid threaded base 24. The threaded base 24 is designed to mate with the threaded opening 16B formed with the baseplate 16 of the oil filter 10. The circular top 22 of the exemplary closure 20 resides within a recessed area 25 defined by the sealing gasket 18, and may be sufficiently large to occupy substantially this entire circular area. When attached to the oil filter 10, as shown in FIG. 4, the threaded base 24 of the closure 20 plugs and seals the fluid outlet 16B while the top 22 covers and seals all perforations 16A of the fluid inlet. According to one exemplary embodiment, the diameter of the top is greater than 5.0 cm, while the diameter of the base is less than 2.0 cm. Additionally, the top and the base of the closure may be integrally formed together (e.g., by molding) as a single homogenous unit.

Figure 2:
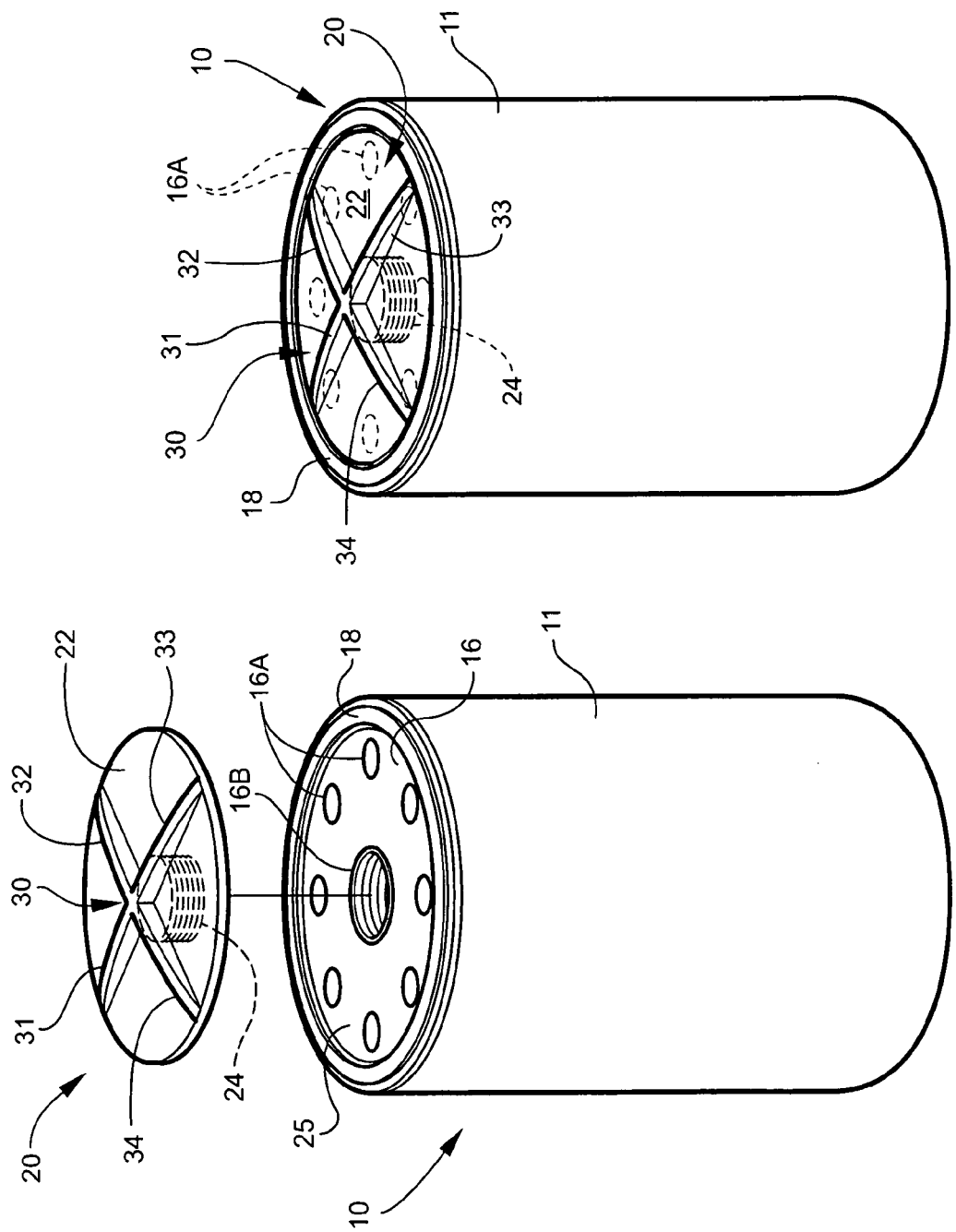
FIG. 2A is a perspective view of the oil filter with the temporary closure removed from an open end of the filter housing.
FIG. 2B is a perspective view of the oil filter with the temporary closure attached.
Figure 5:
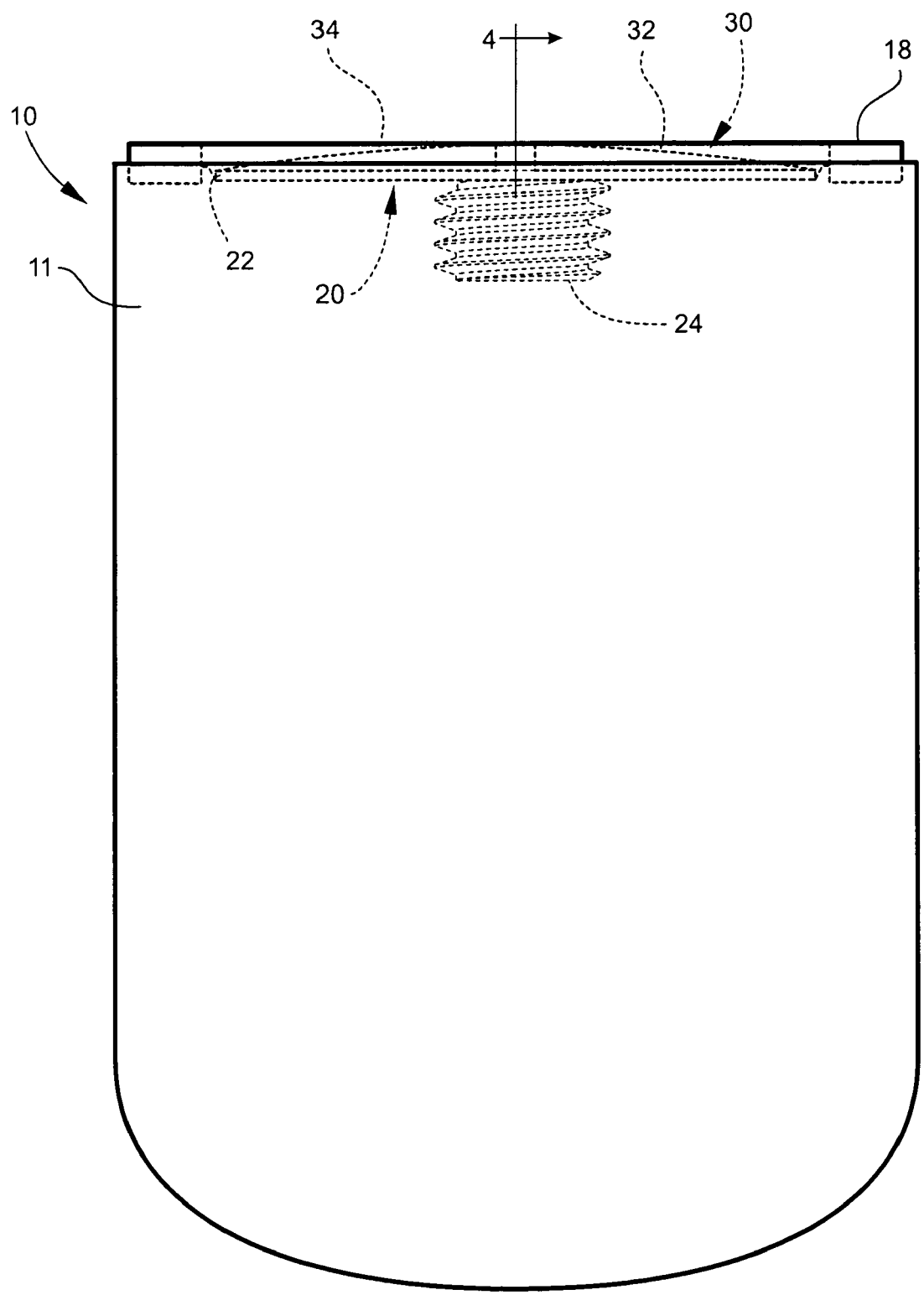
FIG. 5 is a side elevation of the oil filter with the temporary closure attached and illustrated in phantom.

As best shown in FIGS. 2B and 5, the top 22 of the closure 20 may also include an integrally-formed low-profile handle 30 designed to facilitate attachment and removal of the closure 20. The exemplary handle 30 comprises four equally-spaced radial extensions 31, 32, 33, and 34, each having a longitudinal cross-section which tapers in elevation from a center point of the top 22 towards an outside edge of the top 22. The extensions 31-34 may also cooperate to reduce any warping or cupping of the closure 20, and to improve its overall dimensional rigidity. In one exemplary embodiment, the combined maximum height of the top 22 and the handle 30 is less than 1.0 cm.

As indicated previously, the temporary closure 20 functions to substantially contain residual fluid within the filter housing 11 prior to disposal (or "cleaning") of the used fluid filter 10. The temporary closure 20 may be later removed from the used fluid filter 10 to drain the residual fluid contained in the filter housing 11. After the filter housing 11 is substantially drained, the emptied fluid filter 10 may be properly disposed of (or recycled for reuse).

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed:

1. In a fluid filter adapted for operatively mounting within a circuit of moving fluid in a machine, said fluid filter comprising:
    a filter housing defining a fluid inlet, a fluid outlet, and a filtration medium disposed within said filter housing between said fluid inlet and said fluid outlet;
    a temporary closure designed for attachment at said fluid outlet of said fluid filter after said fluid filter is used and removed from the machine, said temporary closure comprising a cylindrical threaded base adapted for mating with a complementary threaded opening at said fluid outlet of said fluid filter, an enlarged-diameter solid wall top formed with said base and adapted for covering both of said fluid inlet and said fluid outlet of said fluid filter, and a low-profile handle formed with said top of said closure and comprising at least one radial extension;
    a filter baseplate located at an open end of said filter housing and defining a circular recess receiving a sealing gasket, the sealing gasket defining a recessed circular area with said baseplate, wherein said top of said closure is adapted to reside entirely down inside the circular area defined by said sealing gasket, such that when said temporary closure is attached to said fluid filter the radial extension of said low-profile handle extends outwardly from said top to a point not beyond the recessed circular area defined by the sealing gasket;
    whereby said temporary closure functions to substantially contain residual fluid within said filter housing prior to subsequent processing of said used fluid filter.

2. A combination according to claim 1, wherein the combined height of said top and said handle is less than 1.0 cm.

3. A combination according to claim 2, wherein the diameter of said top is greater than 5.0 cm.

4. A combination according to claim 3, wherein the diameter of said base is less than 2.0 cm.

5. In a disposable spin-on oil filter adapted for operatively mounting within a circuit of moving fluid in an automobile, said oil filter comprising:
    a filter housing defining a fluid inlet, a fluid outlet, and a filtration medium disposed within said filter housing between said fluid inlet and said fluid outlet;
    a temporary closure designed for attachment at said fluid outlet of said fluid filter after said fluid filter is used and removed from the machine, said temporary closure comprising a cylindrical threaded base adapted for mating with a complementary threaded opening at said fluid outlet of said fluid filter, an enlarged-diameter solid wall top formed with said base and adapted for covering both of said fluid inlet and said fluid outlet of said fluid filter, and a low-profile handle formed with said top of said closure and comprising at least one radial extension;
    a filter baseplate located at an open end of said filter housing and defining a circular recess receiving a sealing gasket, the sealing gasket defining a recessed circular area with said baseplate, wherein said top of said closure is adapted to reside entirely down inside the circular area defined by said sealing gasket, such that when said temporary closure is attached to said fluid filter the radial extension of said low-profile handle extends outwardly from said top to a point not beyond the recessed circular area defined by the sealing gasket;
    whereby said temporary closure functions to substantially contain residual fluid within said filter housing prior to subsequent-processing of said used fluid filter.

6. A combination according to claim 5, wherein the combined height of said top and said handle is less than 1.0 cm.

7. A combination according to claim 6, wherein the diameter of said top is greater than 5.0 cm.

8. A combination according to claim 7, wherein the diameter of said base is less than 2.0 cm.

9. A combination according to claim 8, wherein said top and said base of said closure are integrally molded together as a single homogenous unit.

* * * * *